United States Patent [19]
Monet

[11] Patent Number: 4,724,537
[45] Date of Patent: Feb. 9, 1988

[54] METHOD AND APPARATUS FOR MANAGING THE USE OF AN ELECTRONIC LOCK FOR A MOBILE RADIO TELEPHONE

[75] Inventor: Paul L. Monet, Syracuse, N.Y.

[73] Assignee: Harris Corporation, Melbourne, Fla.

[21] Appl. No.: 651,711

[22] Filed: Sep. 18, 1984

[51] Int. Cl.$^4$ .............................................. H04M 1/66
[52] U.S. Cl. ........................................ 379/58; 379/63
[58] Field of Search ................. 179/2 E, 2 EC, 90 D, 179/2 CA, 18 DA, 2 A, 2 DP; 340/825.31; 379/58, 66, 59, 60, 63

[56] References Cited
U.S. PATENT DOCUMENTS

| | | | |
|---|---|---|---|
| 4,099,033 | 7/1978 | Murray | 179/90 D |
| 4,436,957 | 3/1984 | Mazza et al. | 179/2 EA |
| 4,532,507 | 7/1985 | Edson et al. | 340/825.31 |

*Primary Examiner*—Robert Lev
*Attorney, Agent, or Firm*—L. Lawton Rogers, III; Joseph M. Killeen

[57] ABSTRACT

A method and apparatus for managing an electronic radio telephone lock in which the electronic lock can be rendered operative or inoperative only by first entering a predetermined code so as to prevent unauthorized use as well as accidental or unauthorized locking, code changes, etc.

6 Claims, 1 Drawing Figure

METHOD AND APPARATUS FOR MANAGING THE USE OF AN ELECTRONIC LOCK FOR A MOBILE RADIO TELEPHONE

BACKGROUND OF THE INVENTION

The present invention relates to a method and apparatus for managing the electronic lock of a radio telephone. More particularly, it relates to a method and apparatus for preventing the unauthorized use of the telephone as well as the inadvertent or intentional tampering with the electronic locking device.

Subscribers to telephone service are often charged by the operator of the telephone system for each minute that the telephone is in use, and additional fees per minute of use may also be charged for "long distance" calls. This is particularly true for special purpose telephones such as mobile radio telephones. Accordingly, it is often important to limit operational access of unauthorized persons to a telephone.

The nature of the use of telephones and particularly of mobile radio telephones is such that rigorous control of access to the telephone instrument is difficult to ensure. Often, the goal of limiting access to unauthorized personnel is in direct conflict with a goal of allowing ease of access to authorized personnel. For example, mobile telephones are often installed in automobiles to permit use of the telephone system while driving. However, the authorized user of the telephone is frequently not the only person with access to the automobile. Parking attendants, automobile service personnel and persons borrowing an automobile generally have to be given access to the interior compartment of an automobile and thus have access to a mobile telephone located therein. Likewise, land based telephones must frequently be placed in locations where rigorous control of access to the dialing apparatus of such telephones is difficult to achieve. A telephone installed in a public area may be convenient for authorized users but, at the same time, is accessible to unauthorized persons.

The use of both physical and electronic locks to control the use of telephones is well known. Physical locks, which conventionally are engaged and disengaged by means of a key or combination, mechanically impede a would-be user from obtaining access to a portion of the telephone instrument necessary for dialing.

Telephone systems which utilize a key or other physical device to lock and unlock the telephone instrument require the telephone user to carry the key whenever use of the telephone is desired. An authorized user of a telephone who, for whatever reason, does not have the unlocking key in his possession is denied the ability to place telephone calls.

Electronic lock systems generally obviate the need for carrying a key because such systems generally can be locked by activation of a single switch or button and are unlocked by the execution of the correct unlocking sequence. Other known electronic locks automatically lock the controlled device after each use. However, such electronic systems can often be accidentally locked or locked by unauthorized persons, by the mere activation of a simple locking switch without any knowledge of the operating code.

Electronic locks are known in which telephone dialing may be inhibited by the activation of a switch or button on the telephone instrument. When the locking button or switch is activated, the control circuits in the telephone instrument inhibit dialing by not transmitting the dialing signals necessary to establish communication between the telephone instrument and the telephone network. Frequently, such electronic locks may be unlocked by performing an unlocking sequence consisting of entering an unlock code comprising a predetermined code sequence. If the correct code sequence is input, the control circuit removes the inhibit and enables the transmission of the dialing signals. Electronic locks for telephone instruments of this type are disclosed in U.S. Pat. No. 4,099,033 issued to Murray on July 4, 1978; U.S. Pat. No. 4,314,108 issued to Shauvit on Feb. 2, 1982; and United Kingdom Patent Application No. 2,086,188 by Feuell filed May 6, 1982.

If a lock is accidentally locked, or tampered with, an authorized user of the mobile telephone who does not know the unlocking sequence will be denied use of the telephone. Additionally, an authorized user who mistakenly believes that he knows the unlocking sequence may intentionally activate the locking mechanism and henceforth be unable to unlock the system, possibly at the expense of an expensive service call to open the instrument for the purpose of reprogramming the locking sequence.

It is therefore an object of the present invention to obviate these and other problems in known electronic locking systems and to provide a novel method and apparatus for managing the use of an electronic lock, particularly for mobile radio telephones.

It is another object of the present invention to provide a novel method and apparatus for controlling the use of telephone instruments without the use of a key.

It is yet another object of the present invention to provide a novel method and apparatus for ensuring the correctness of the unlocking sequence prior to engaging an electronic lock.

These and many other objects and advantages of the present invention will be apparent to one skilled in the art from the claims when read in conjunction with the appended drawing.

DRAWING

FIG. 1 is a functional block diagram of an embodiment of the apparatus of the present invention.

DETAILED DESCRIPTION OF A PREFERRED EMBODIMENT

One embodiment of the electronic locking system of the present invention is illustrated in a mobile telephone instrument in FIG. 1. In the figure, an input device such as a keypad 10 provides input signals to a control circuit 12. The keypad 10 contains a plurality of keys, some of which represent commands and others of which represent the digits 0 through 9 in a standard telephone instrument keypad. To assist a telephone user, a display 14 is provided to echo commands and digits entered on the keypad 10. The control circuit 12 communicates with a storage device 16 and controls the operation of dialing signals from a dialing signal generator 18 to a transmitter 20. The audio signals to be transmitted by the telephone instrument are received by a microphone 22 and are converted to electrical signals which are passed to the transmitter 20 through one portion of a ganged switch 24. Similarly, electrical signals representative of audio signals are received by the telephone instrument through an antenna 26 to a receiver 28 and subsequently to a speaker 30. The speaker 30 converts the electrical signals into audio signals. The electrical connection between the receiver 28 and the speaker 30 is switched via the other portion of the ganged switch 24. Additionally, signals received by the receiver 28 are passed directly to the control circuit 12 so that incoming telephone calls may be detected and announced.

If a user wishes to place a call on the telephone instrument which is enabled or unlocked, the user depresses appropriate keys on keypad 10 to indicate that a call is to be placed and the telephone number which the user desires to call. Upon receipt of the signal from the keypad 10, the control circuit 12 performs a standard communications repertoire first to obtain an available transmission channel from a base station and second to send the appropriate tone signals from the dialing signal generator 18 to the antenna 26 through the transmitter 20 in order to signal the base station of the telephone number of the telephone being called. To complete the audio circuit which enables the user to transmit his voice signal and hear the incoming signal, the control circuit 14 closes ganged switch 24, connecting the microphone 22 to the transmitter 20 and the receiver 28 to the speaker 30.

Subsequently, when the telephone call or calls are completed and the user desires to inhibit any further telephone dialing by unauthorized persons, the user depresses certain keys of the keypad 10 which correspond to the unlock sequence and indicates to the control circuit 14 via one of the keys of the keypad 10 that he desires the telephone be locked. Upon receiving the unlock sequence and the lock command, the control circuit 12 compares the unlock sequence to a sequence previously stored in the storage device 16. If the unlock sequence received from the keypad 10 matches the sequence stored in the storage device 16, the control circuit 14 disables the telephone instrument by opening the ganged switch 24. If the unlock sequence received from the keypad 10 does not match the sequence stored in the storage device 16, the control circuit 12 ignores the lock command and provides an indication on display 14 that the telephone instrument is still unlocked.

The unlock sequence which both locks and unlocks the telephone instrument may be a predetermined sequence of input signals from the keypad 10. Although described above as preceding the input signal indicating a lock command, the unlock sequence may also be entered after the lock command or both before and after the entry of the lock command. Indeed, the lock command may be eliminated entirely if an unambiguous unlocking sequence is selected.

Whenever the telephone instrument is in the unlocked state, it is possible to change the unlock sequence by either activating a code change switch on the keypad 10 or by operating a second code sequence indicative of a code change command. Upon receiving the code change command, the control circuit 12 will accept and store in the storage device 16 the new lock sequence.

While the memory storage device 16 has been heretofore described as an electronic storage device, the present invention does not so require, and the storage device may be any method of indicating a code sequence to the control circuit 14, e.g., coding plugs for grounding certain wires attached to the control circuit 12 and indicative of a coding sequence.

The control circuit 12 may be designed to inhibit all calls (both incoming and outgoing), inhibit outgoing calls, or inhibit incoming calls only, because the control circuit 12 controls both the dialing signal generator 18 and the switch 24 to the communication paths between the microphone 22 and the transmitter 20 and between the receiver 28 and the speaker 30.

From the foregoing, it will be apparent that the present invention provides unique management control of the use of a mobile telephone. Only authorized users can operate the lock, and can do so without a physical key. Moreover, the use of a single code sequence for both locking and unlocking reduces the possibility of confusion between the locking and unlocking codes and lapses of memory. Requiring that the code sequence be input before locking eliminates the possibility of inadvertent locking by an error or mistake in the code sequence. Tampering is also inhibited.

These and many other advantages of the present invention will be obvious to one skilled in the art from the claims. It should be understood that the foregoing description of the preferred embodiment is illustrative only, and that many modifications may be made without departing from the spirit thereof as defined in the claims when accorded a full range of equivalents.

What is claimed is:

1. A method of managing the use of a mobile radio telephone comprising the steps of:
    (a) providing a mobile radio telephone having a plurality of input keys;
    (b) providing an electronic lock responsive to the successive operation of a predetermined sequence of said keys to lock and unlock the telephone;
    (c) requiring entry of the predetermined sequence of keys prior to unlocking the telephone; and
    (d) requiring entry of the predetermined sequence of keys prior to locking the telephone;
whereby both unauthorized use and inadvertent or unauthorized locking of the telephone may be achieved without a physical key.

2. A method of managing the use of a mobile radio telephone comprising the steps of:
    (a) providing a mobile radio telephone;
    (b) providing an electronic lock responsive to a single predetermined code sequence;
    (c) requiring entry of the code sequence as a condition precedent to the enabling of the telephone; and
    (d) requiring entry of the code sequence as a condition precedent to the disabling of the telephone,
whereby both unauthorized use and inadvertent or unauthorized disabling of the telephone may be achieved without a physical key.

3. A method of preventing unauthorized use of an electronic lock comprising the steps of:
    providing an electronic lock responsive to a plurality of preselected electronic signals in a preselected sequence for opening said lock;
    opening said lock by applying said plurality of preselected electronic signals in said preselected sequence; and
    closing said lock only upon the receipt by said lock of said plurality of preselected electronic signals in said preselected sequence, so that said lock cannot be closed except by persons knowing said plurality of preselected electronic signals in said preselected sequence.

4. A security device for a telephone instrument comprising:
    selectively operable inhibit means to prevent the use of said instrument;
    signal recognition means operable to receive a plurality of signals representing a predetermined code; and control means, responsive to said signal recognition means, to operate said inhibit means and to disable said inhibit means only upon the receipt of said predetermined code.

5. An electronic lock device to prevent unauthorized use of a telephone instrument, comprising:
digital input means for the receipt of input signals from a user of said instrument;
locking means operative to selectively prevent use of said instrument;
logic means responsive to said digital input means and controlling said locking means, said logic means enabling said locking means upon the receipt of a predetermined sequence of input signals by said digital input means and disabling said locking means upon the receipt of said predetermined sequence of input signals.

6. In an electronic lock for a telephone having an input means providing a plurality of different signals, each signal representing an input signal from a user, a memory means for storing a plurality of memory signals, each said memory signal representing at least one of said input signals and a control means for selectively inhibiting operation of the telephone, a method of preventing accidental or unauthorized operation of said control means comprising the steps of:
receiving a predetermined plurality of input signals;
comparing said plurality of input signals with said plurality of memory signals; and
operating said control means only if each of said plurality of input signals matches said plurality of memory signals, thereby to prevent persons not knowing the plurality of memory signals from operating said lock.

* * * * *

UNITED STATES PATENT AND TRADEMARK OFFICE
CERTIFICATE OF CORRECTION

PATENT NO. :  4,724,537
DATED      :  February 9, 1988
INVENTOR(S) :  Paul L. Monet It is certified that error appears in the above-indentified patent and that said Letters Patent is hereby corrected as shown below:

Column 3, lines 20, 28, 35, and 61, for the drawing reference numeral "14", each occurrance, should read --12--.

Signed and Sealed this

First Day of July, 1997

Attest:

BRUCE LEHMAN

Attesting Officer

Commissioner of Patents and Trademarks

(12) EX PARTE REEXAMINATION CERTIFICATE (4926th)
United States Patent
Monet

(10) Number: US 4,724,537 C1
(45) Certificate Issued: Apr. 13, 2004

(54) METHOD AND APPARATUS FOR MANAGING THE USE OF AN ELECTRONIC LOCK FOR A MOBILE RADIO TELEPHONE

(75) Inventor: Paul L. Monet, Syracuse, NY (US)

(73) Assignee: Harris Corporation, Melbourne, FL (US)

Reexamination Request:
No. 90/005,578, Dec. 1, 1999

Reexamination Certificate for:
Patent No.: 4,724,537
Issued: Feb. 9, 1988
Appl. No.: 06/651,711
Filed: Sep. 18, 1984

Certificate of Correction issued Jul. 1, 1997.

(51) Int. Cl.$^7$ ............................................. H04M 1/66
(52) U.S. Cl. ...................................................... 455/565

(56) References Cited

U.S. PATENT DOCUMENTS

| | | | |
|---|---|---|---|
| 3,508,202 A | 4/1970 | Joel, Jr. | 340/164 |
| 3,958,231 A | 5/1976 | Hoffman | 340/274 |
| 4,114,147 A | 9/1978 | Hile | 340/528 |
| 4,510,623 A | 4/1985 | Bonneau et al. | 455/181 |

FOREIGN PATENT DOCUMENTS

| | | |
|---|---|---|
| JP | 46-62189 | 4/1973 |
| JP | 54-91242 | 2/1981 |

OTHER PUBLICATIONS

Motorola Communications and Electronics Inc., "DYNA T.A.C. 8000X Cellular Portable Telephone User's Manual," pp. 1–50 (Feb. 20, 1984).

Motorola, Southwest Newswire Press Release dated Mar. 13, 1984 regarding *"Motorola Announces Complete New Cellular Portable and Mobile Telephone Product Line Available Now"*, pp. 1–3.

Mortorola, Newswire Press Release dated Mar. 13, 1984 regarding *"Motorola's communication sector Introduces the most complete and comprehensive line of cellular portable and mobile telephones available in the industry today."* pp. 1–3.

Harris Corp., RF Communications Group, Mobile Telephone Division, "Cellular Mobile Telephone Operator's Instruction Manual," *Alpha Custom,* pp. 1–56 and A1–A4 (2/85).

Harris Corp., RF Communications Group, "Mobile Telephone Operator's Instruction Manual," *Alpha E/ET,* pp. 1–36 and A1–A2 (3/84).

Harris Corp., RF Communications Group, "Mobile Telephone Operator's Instruction Manual," *Alpha 40,* pp. 1–19 (1982) and Addendum No. AD–6624–1404(4/88).

"Motorola DYNA T.A.C 6000X Universal Mobile Telephone," Product Brochure, pp. 1–5.

"DYNA T.A.C Cellular Mobile Telephone General Description," Technical Writing Services, Schaumburg, IL, Jun. 15, 1983, pp. 1–3.

"Operating Instructions for the Emerald Radiophone", British Telecom Radiophone, 4 pages.

"Operating Instruction for the Sapphire Radiophone", British Telecom Radiophone, 4 Pages.

British Telecom Time Line Chart, 1 Page.

"Radiophone No Longer Just an Executive Toy," Telecom, Feb. 1984, p. 5.

Extra Features Make Sapphire a Gem, Telecom, Mar. 1984, p. 4.

"Stornomatic 900 User Instructions," Storno Radio Communications Systems, 7 Pages.

"Televa Cargo Ammattilaisen NMT–Autopuhelin," Advertisement, 1 Page.

"Quattro Keyboard Buttons and Indicators," Communications Systems, 1983, 1 Page.

*Primary Examiner*—Lee Nguyen

(57) ABSTRACT

A method and apparatus for managing an electronic radio telephone lock in which the electronic lock can be rendered operative or inoperative only by first entering a predetermined code so as to prevent unauthorized use as well as accidental or unauthorized locking, code changes, etc.

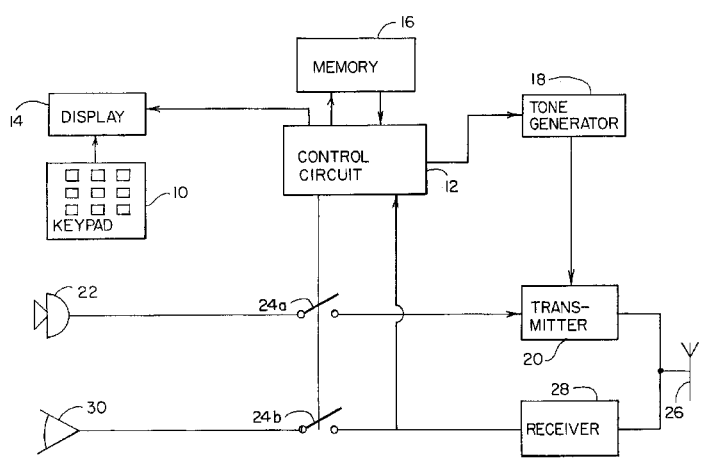

EX PARTE REEXAMINATION CERTIFICATE ISSUED UNDER 35 U.S.C. 307

Figure 1:
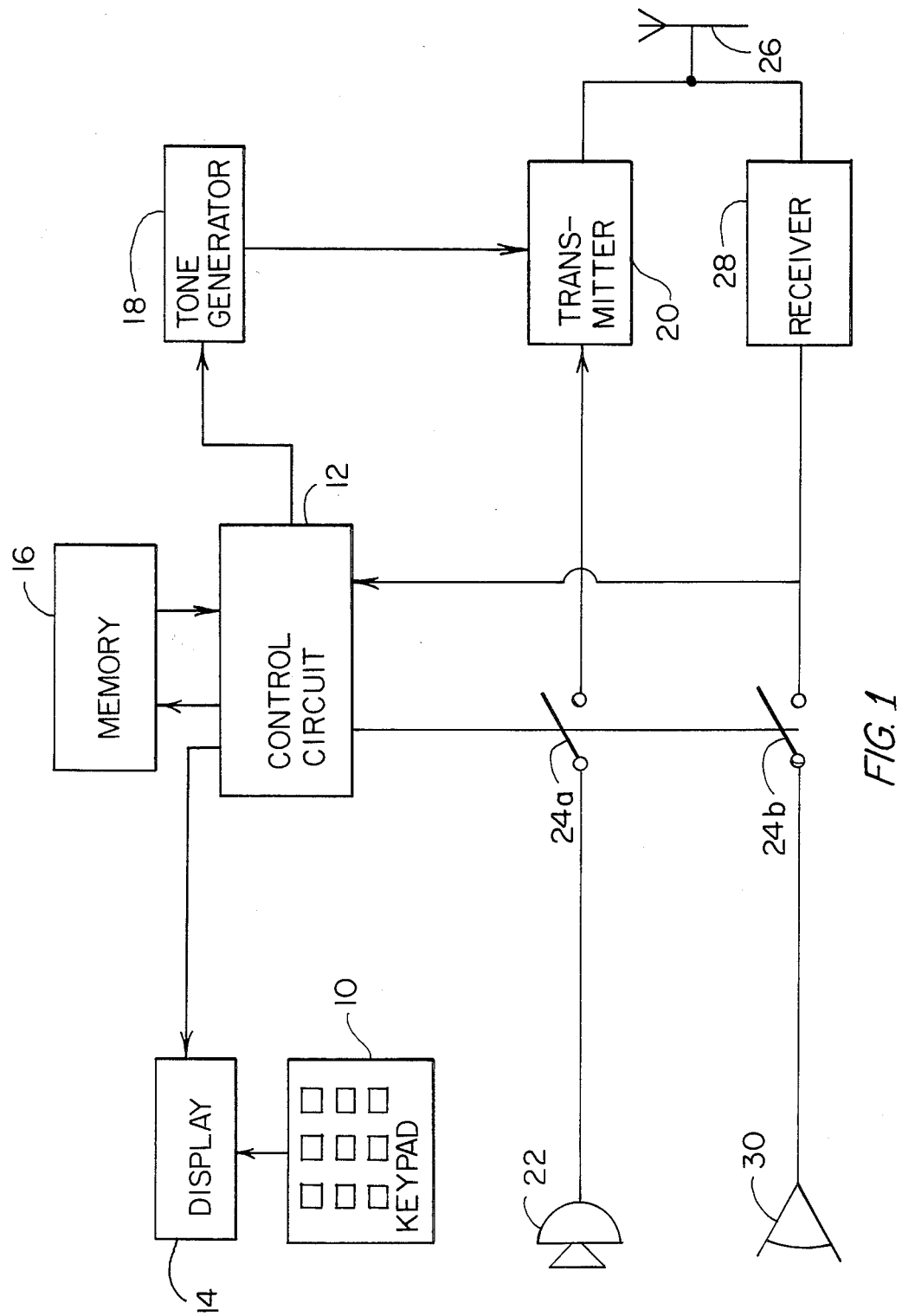

THE PATENT IS HEREBY AMENDED AS INDICATED BELOW.

AS A RESULT OF REEXAMINATION, IT HAS BEEN DETERMINED THAT:

Claims 1–5 and 6 are cancelled.

\* \* \* \* \*